J. CRAWFORD.
FLY TRAP.
APPLICATION FILED JAN. 17, 1914.
1,131,120.
Patented Mar. 9, 1915.
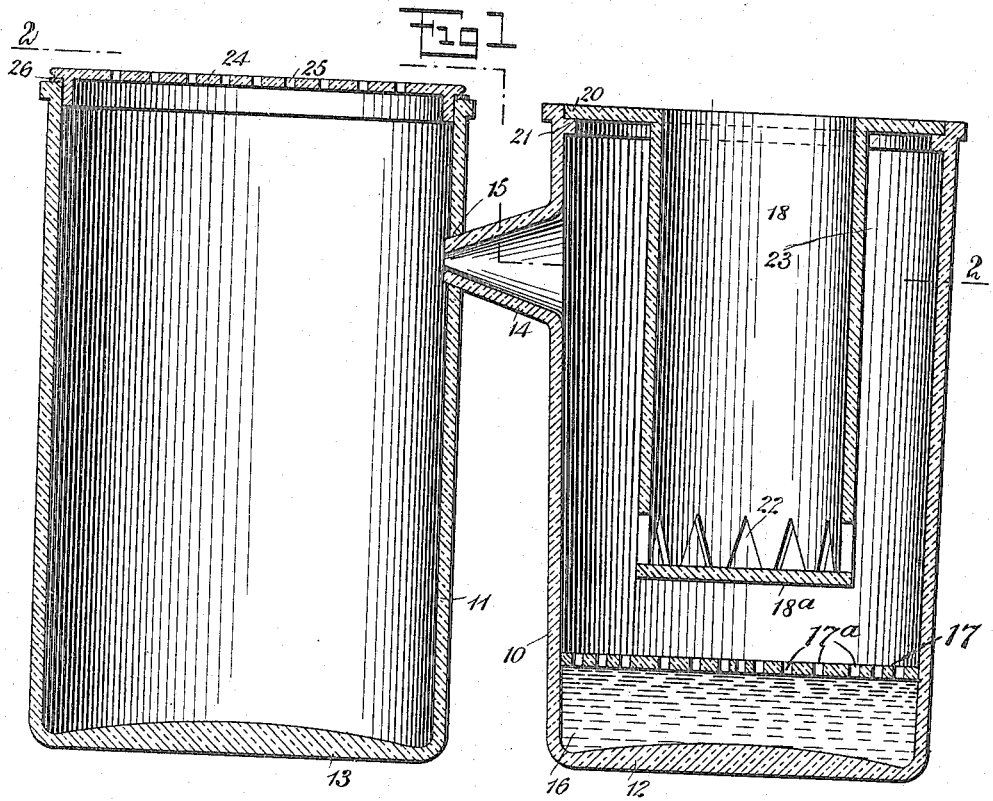
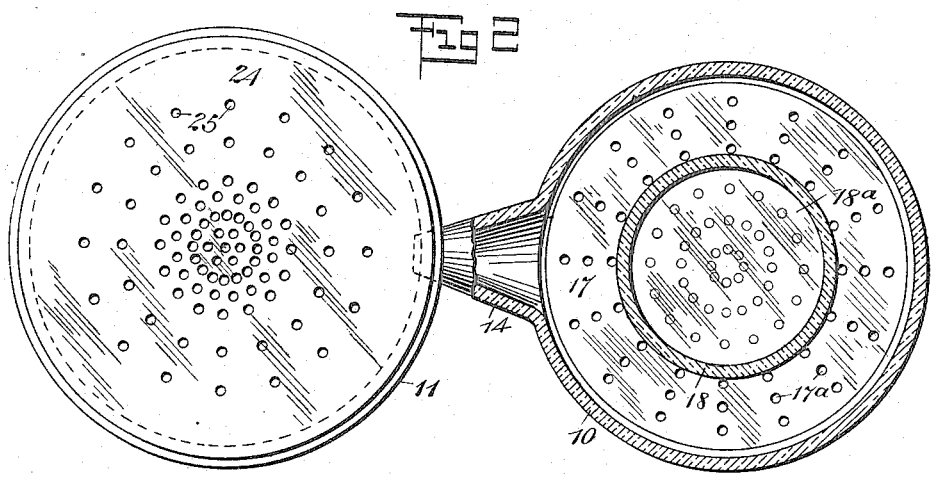
WITNESSES
INVENTOR
James Crawford
BY
ATTORNEYS

UNITED STATES PATENT OFFICE.

JAMES CRAWFORD, OF EL PASO, TEXAS.

FLY-TRAP.

1,131,120. Specification of Letters Patent. Patented Mar. 9, 1915.

Application filed January 17, 1914. Serial No. 812,688.

*To all whom it may concern:*

Be it known that I, JAMES CRAWFORD, a citizen of the United States, and a resident of El Paso, in the county of El Paso and State of Texas, have invented a new and Improved Fly-Trap, of which the following is a full, clear, and exact description.

An object of my invention is to provide an improved fly trap to which the flies will be readily attracted, and to which they will find free and ready entrance; and a further object of the invention is to so form the trap that the trapped flies may be conveniently and readily disposed of, and the trap be adapted for thorough and convenient cleaning in order to preserve its sanitary condition.

The invention will be particularly explained in the specific description following.

Reference is to be had to the accompanying drawings forming a part of this specification, in which similar characters of reference indicate corresponding parts in both views.

Figure 1 is a transverse vertical section of a fly trap constructed in accordance with my invention; and Fig. 2 is a plan view with parts in section, on the line 2—2 of Fig. 1.

In carrying out my invention, two transparent containers are provided, which are generally in the form of glass jars, the one, 10, constituting a lure and trap chamber, and the other, 11, constituting a collecting chamber. Each container separately rests and is supported on its own bottom 12, 13, and the containers are separate and distinct, except that one has a laterally tapering neck 14 entering a lateral orifice 15 in the other container to afford passage for the flies from the trap chamber to the collecting chamber. In the bottom of one container a suitable liquid or other lure or bait 16 is placed, below a false bottom 17 provided with perforations 17ª which are not of a size to permit the passage of flies therethrough.

To afford an ample and free inlet for the flies to the container 10 having the bait 16, a tubular inlet 18 is provided, presenting preferably a wide circular mouth 19 having a flange 20 supported at its outer edge on an interior flange 21 on the container 10. The said tubular inlet 18 extends downwardly, the bottom 18ª being preferably disposed above the false bottom 17. Lateral outlet passages 22 lead from the inlet 18, adjacent to the bottom 18ª to the annular chamber 23 formed between the said inlet and the inner surface of the container 10. The said chamber 23 constitutes a trap chamber and communicates with the lateral passage provided by the neck 14. The container 11 forming the collecting chamber is provided with a removable cover 24, which may be formed with orifices 25 sufficiently small to prevent the escape of flies.

With the described construction, the transparent character of all the parts permits of the flies at the interior being readily seen by the flies on the exterior, and with the attraction of the bait and the large inlet tube, the flies are induced to enter the inlet and will readily find entrance to the trap chamber 23. As the said chamber extends on all sides of the inlet, the flies eventually arrive at the lateral outlet 14 and pass into the collecting chamber.

By providing the containers in the form of jars, each adapted to rest on its own bottom, the two containers may be more conveniently manipulated in preparing and cleaning the trap. The construction permits of a thorough cleaning of the several parts, and the trap is maintained in a sanitary condition; also the collecting chamber is substantially a plain jar, except for its lateral inlet passage, and the flies may be readily destroyed therein by submerging the jar, water finding ready entrance through the orifices 25 in the removable cover.

Having thus described my invention, I claim as new, and desire to secure by Letters Patent:

A trap of the character described, comprising two separable glass containers, each resting on its own bottom independently of the other, the one glass container consisting of a jar-like body constituting a collecting chamber and having a lateral inlet opening, and the other container constituting a trap and lure chamber and comprising a jar-like glass body, a tapering lateral extension entering the inlet opening of the collecting chamber, a removable glass cover having a depending cylindrical inlet tube of glass open at its upper end and having a closed bottom end above the bottom of the body, the said inlet tube having lateral outlets in annular series adjacent to the closed bottom of the said inlet tube, the cylindrical wall of the tubular inlet being free from lateral projections at the said outlets, and a false bottom between the bottom of the inlet tube and the bottom of the body, there being a clear space at all sides of the inlet tube, and below the bottom of the said tube, in communication with the lateral extension on the body.

In testimony whereof I have signed my name to this specification in the presence of two subscribing witnesses.

JAMES CRAWFORD.

Witnesses:
W. J. REGAN,
F. J. GARRETT.

Copies of this patent may be obtained for five cents each, by addressing the "Commissioner of Patents, Washington, D. C."